United States Patent
Shepard

(10) Patent No.: US 7,262,579 B1
(45) Date of Patent: Aug. 28, 2007

(54) INVERTED ELECTRIC MOTOR AND METHOD FOR USING SUCH TO PROPEL A VEHICLE

(75) Inventor: BJ Shepard, Charlotte, NC (US)

(73) Assignee: Component Systems Inc., Charlotte, NC (US)

( * ) Notice: Subject to any disclaimer, the term of this patent is extended or adjusted under 35 U.S.C. 154(b) by 0 days.

(21) Appl. No.: 11/352,904

(22) Filed: Feb. 13, 2006

(51) Int. Cl.
H02P 23/00 (2006.01)

(52) U.S. Cl. .................. 318/810; 318/732; 318/727; 318/776; 318/830

(58) Field of Classification Search ............ 318/810, 318/732, 727, 773, 776, 830, 831; 310/114, 310/67, 201
See application file for complete search history.

(56) References Cited

U.S. PATENT DOCUMENTS

| | | | |
|---|---|---|---|
| 4,488,053 A * | 12/1984 | Cronin | .......... 290/4 C |
| 5,677,604 A | 10/1997 | Masaki | |
| 5,677,610 A | 10/1997 | Tanamachi | |
| 5,677,611 A | 10/1997 | Yoshihara | |
| 5,821,706 A | 10/1998 | Koga | |
| 2001/0042498 A1* | 11/2001 | Burnham | ......... 114/55.56 |
| 2004/0212259 A1* | 10/2004 | Gould | ............. 310/67 R |
| 2005/0052080 A1 | 3/2005 | Maslov | |
| 2005/0218738 A1 | 10/2005 | Hsu | |

OTHER PUBLICATIONS

Kristin Roth, Next Generation Hybird, Popular Mechanics Magazine p. 83-84, Oct. 2005 USA.
By Popular Mechanics Auto Editors, Hybirds at the crossroads Popular Magazine,Feb. 2006, pp. 73-79 and p. 112 USA.
Andres R Martinex, Bush Energy Law Will Sweeten Incentives To Buy Hybird Vehicles, In Charlotte Observer News Paper Prox. Oct. 2005 USA.
Gina Chon, Hybird Gripes Heard, Wall Street Journal and Reprinted In Charlotte Observer News Paper Prox. Oct. 2005 USA.
National Renewable Energy Laboratory, Aadvanced Energy Storage, Batteries, Last update Feb. 3, 2005, Printed Aug. 23, 2005 USA.
EV World Electric Hybird, Flexable Fuel Electric [Plug in] Hybird Copied From Internet Aug. 21, 2005 USA.
B. J. Shepard, Where The Rubber Meets The Road, Engineering Explination, Aug. 4, 2005.
Jim Meigs, Testing Hybird Hype, Popular Mechanics, Feb. 2006, p. 14.

* cited by examiner

Primary Examiner—Karen Masih

(57) ABSTRACT

An alternating current, multiphase, squirrel cage induction electric motor in a unique inverted design, including a method of applying the motor with controls, operator interface, batteries, and peripheral devices to propel a non-polluting electric vehicle.

19 Claims, 4 Drawing Sheets

INVERTED ELECTRIC MOTOR AND METHOD FOR USING SUCH TO PROPEL A VEHICLE

BACKGROUND OF INVENTION

1. Field of Invention

This invention relates to an inverted, electric motor and method of using such an inverted electric motor with or without an internal combustion engine to propel a vehicle.

2. Description of Prior Art

For many years, most passenger and freight vehicles have used an internal combustion engine as the only source of power to rotate the drive wheels. This has been done thru a clutch, transmission, drive shaft, differential reduction gears and axles. Over the years, peripheral devices have been added to vehicles to provide comfort, entertainment, and additional control. In recent years, air pollution concerns and fuel storage concerns have forced positive changes in air pollution standards and fuel storage laws. Also in recent years, the rising cost of fuel has made the internal combustion engine less attractive to use as the only source of power.

To alleviate the concerns of the rising costs of fossils fuels and pollution, inventors have designed electric vehicles that are propelled solely via electric motors. One disadvantage of conventional electric vehicles is increased cost due to the addition of multiple gears that are used to produce additional torque. The addition of multiple gears also decreases the efficiency of the vehicle.

In recent years, inventors have also designed hybrid vehicles that are propelled by a combination of an internal combustion engine and an electric motor. Internal combustion engines are used to propel the hybrid vehicle for long periods of time. Conversely, the electric motor is used only occasionally for propulsion or to provide additional power along with the combustion engine for short periods of time. Hybrid cars, despite the increased cost, have provided little improvement in fuel efficiency and/or lower pollution. Additionally, hybrid cars have numerous mechanical parts such as the multiple gears in the transmission, drive shaft, universal joints, transaxle, constant velocity joints, and geared differential or rotating axle shafts. Maintenance and repair of these numerous parts also add to the expense of owning a hybrid.

The literature is replete with vehicles that are propelled solely by electric motors or propelled by a combination of an internal combustion engine plus an electric motor. Patents and patent application publications discussing electric vehicles include Williams U.S. Pat. No. 4,099,589 and Kuwayama U.S. Patent Application Publication 20010045307, respectively. Patents discussing hybrid vehicles include Yamaguchi et al. U.S. Pat. No. 6,488,608 B2, Koga 5,821,706, and Severinsky 5,343,970.

Although the prior art addresses the issue of using electric vehicles and hybrid vehicles as alternatives to the exclusive use an internal combustion engine, the prior art devices do not provide an alternative that is desirable and affordable. What is desired is an affordable electric vehicle that does not contain gears, that produces ample torque, that provides for maximum efficiency, and that has low maintenance costs.

SUMMARY OF THE INVENTION

The present invention is a simple device that can be used to propel a vehicle solely through the use electricity.

The inverted, alternating current, multiphase induction electric motor is comprised of a laminated squirrel cage rotor, a laminated stator, a plurality of wire coils, a motor starter, at least one battery pack, and a means for attaching the rotor to a rotational device.

The squirrel cage rotor is an active electric part that is made of electrical sheet steel and comprises a plurality of notched laminations. The notched laminations are used to hold the copper alloy squirrel cage. The inside diameter of the rotor is larger than that of the stator, but is small enough such that the rotor can be mounted inside of a wheel or other rotational device. In alternate embodiments, the rotor may be made of an aluminum casting and may have a plurality of permanent magnet segments along its inside diameter.

The stator is laminated and made of electrical sheet steel. The stator has a smaller outside diameter than the rotor and is disposed within the rotor with calculated precision such that there is an air gap of 0.020-0.050 inches between the stator and the rotor. The stator also comprises a plurality of notched laminations and the notched laminations are used to hold a plurality of electric wire coils.

A plurality of electric wire coils traverses the notched laminations of the stator. After traversing the notches of the stator a predetermined number of times, each of the electric wire coils converges to form lead wires. The lead wires are numbered and then grouped by numbers for connection to the required voltage.

A motor starter provides connections at its output providing connections for the lead wires of the electric motor. The motor starter can be a programmable variable frequency, variable voltage motor controller having a remote mounted operator controlled interface connected to its control circuit. In alternate embodiments, the motor controller can be a programmable solid state direct current motor control.

At least one battery pack is connected to the DC Buss of a programmable variable frequency, variable voltage motor controller having a remote mounted operator controlled interface. For more complex vehicles, a secondary battery pack can be used to provide power to peripheral devices requiring lower voltage than the primary battery pack. Each battery pack has connectors for an external battery charger.

A mounting hub serves as a means of attaching the rotor of the inverted, electric motor to a rotational device such as a wheel. The mounting hub, comprises a double side flange, can be made of materials including, but not limited to, steel or aluminum alloy. The mounting hub provides internal surfaces to mount tapered roller bearings, grease seals, and provides a means for securing and preloading the bearings to the support shaft/spindle.

A rotating protective motor housing made of a light weight metal such as cast aluminum can also be attached to the double sided flange of the mounting hub. The purpose of the protective motor housing is to protect the motor while providing heat dissipation and providing a mounting surface for a brake rotor if needed.

Additionally, the inverted electric, motor of the present invention can be combined with an internal combustion engine, direct current generator, and alternator. The internal combustion engine supplies power to rotate the direct current generator for charging the primary storage battery pack and the primary battery pack powers the wheels through the controller and remote mounted operator interface. The internal combustion engine also supplies power to rotate the alternator. The alternator then supplies direct current to provide power to a secondary battery pack and the secondary battery pack powers the peripheral devices requiring a lower voltage than the primary battery pack.

Even when an internal combustion engine is added, the internal combustion engine does not propel the vehicle. The internal combustion engine only powers the direct current generator for charging the primary storage battery pack and powers peripheral devices such as an alternator with direct current output for charging the secondary storage battery pack. The internal combustion engine does not directly propel the vehicle at any time and runs only when a sensor such as a battery voltage detector calls for charging. The purpose of the engine is to add more time and miles between recharging of the battery packs from the commercial grid powered battery charger connection. The internal combustion engine only runs at an idle speed or at a full design speed, as required for the direct current generators output. The full design speed is the best combination of speeds for efficiency of fuel and the lowest possible pollution out of the engine. The methods used in the present invention optimize the performance of the electric vehicle.

Another embodiment of the present invention may include an inverted motor comprised of a permanent magnet rotor, a laminated stator having a plurality of notches, a plurality of electric coils that traverse the notches of the stator, a motor starter, at least one battery pack having connections for an external battery charger, and a means of attaching the rotor to a rotational device. In this alternate embodiment, the rotor is an active part, is made of cast aluminum, and has a plurality of permanent magnet segments disposed within the inside diameter of the rotor. The stator is made of laminations of electrical sheet steel, has a smaller inside diameter than the rotor, and is disposed within the rotor. The motor starter of this alternate embodiment may be a programmable solid-state direct current motor control with remote mounted operator controlled interface. The means for attaching the rotor to a rotational device is a mounting hub comprises a double sided flange. Additionally, this embodiment of the present invention may include a protective motor housing. The inverted, motor of this alternate embodiment may also be used in combination with an internal combustion engine, direct current generator, alternator, and secondary battery pack to provide power to peripheral devices that require lower voltage than the primary battery pack.

The various parts of the inverted, electric motor such as the rotor, stator, mounting hub, and protective motor housing, can be fabricated of materials that have good performance, strength, and durability. The rotor and stator can be made of materials, including but not limited to, electrical sheet steel and aluminum casting. Additionally, the mounting hub can be made of materials such as, but not limited to, steel or aluminum alloy. The squirrel cage is made from copper alloy. The protective rotating motor housing can be made of light weight metals, including but not limited to, cast aluminum alloy.

Additionally, the inverted electric motor can be overloaded and caused to produce additional torque for several minutes, without overheating. The same is true of the motor control. The motor control can be programmed for the additional power and time. The modified motor control is internally heat sensitive and the current allowed to pass through it would be reduced as needed, to a level low enough, to allow for safe temperature operation. The additional torque allows for faster starts and quicker acceleration during passing or for just getting out of a pothole.

Additionally, a vehicle using the inverted electric motor does not lose traction and speed out of control if one wheel loses traction, due to wheel bounce or a stick surface. The opposite wheel still provides normal torque and speed, even when one looses traction. A vehicle using a geared differential with axles and wheels attached would normally speed out of control with one wheel that has lost traction while the opposite wheel would not be provided with any torque. The loss of traction with the geared differential can be somewhat overcome by adding clutches inside, sensors and additional controls.

OBJECTS & ADVANTAGES

The principal object of the present invention is to produce an inverted, electric motor that is capable of propelling a vehicle by using electricity only.

Another object of the present invention is to produce an electric motor that provides maximum efficiency.

Another object is to use the principles of a conventional industrial duty, alternating current, multi-phase, squirrel cage design, induction electric motor to propel a vehicle.

An additional object is to efficiently propel a vehicle using an inverted, alternating current, multiphase, squirrel cage design electric motor with a programmable variable frequency, variable voltage motor control and a remote mounted operator controlled interface.

A further object of the present invention is to provide an inverted, alternating current, multiphase, squirrel cage design electric motor that can be mounted directly to a wheel or wheels.

Another object of the present invention is to provide a simple control system for an electric vehicle.

Another object is to provide an electric motor that has less mechanical and electrical parts than electric motors utilized in previous electric vehicles or utilized in the present hybrid vehicle.

An additional object is to provide an electric motor that adds little or no cost to the purchase price of a vehicle and that produces minimal or no pollution.

A further object of the present invention is to produce an electric motor that has low maintenance costs.

An additional object of the invention is use an internal combustion engine to power a direct current generator fbr charging at least one battery pack and to add more time/miles between recharging of battery packs from a charger powered by a commercial electric grid.

Another object of the present invention is to use an inverted electric wheel motor that is designed to be overloaded to produce additional torque and fast acceleration.

An additional object of the present invention is to produce an inverted electric wheel motor that does not lose traction and speed out of control if one of the wheels loses traction.

A further object of the invention is to create an operator controlled interface that that can be remote mounted and is integral to the controlled operation and safety of a vehicle.

DETAILED DESCRIPTION OF PREFERRED EMBODIMENT

Advantages of this invention will be apparent from the following description of the preferred embodiment of the present invention when considered with the illustrations and drawings.

Figure 1A:
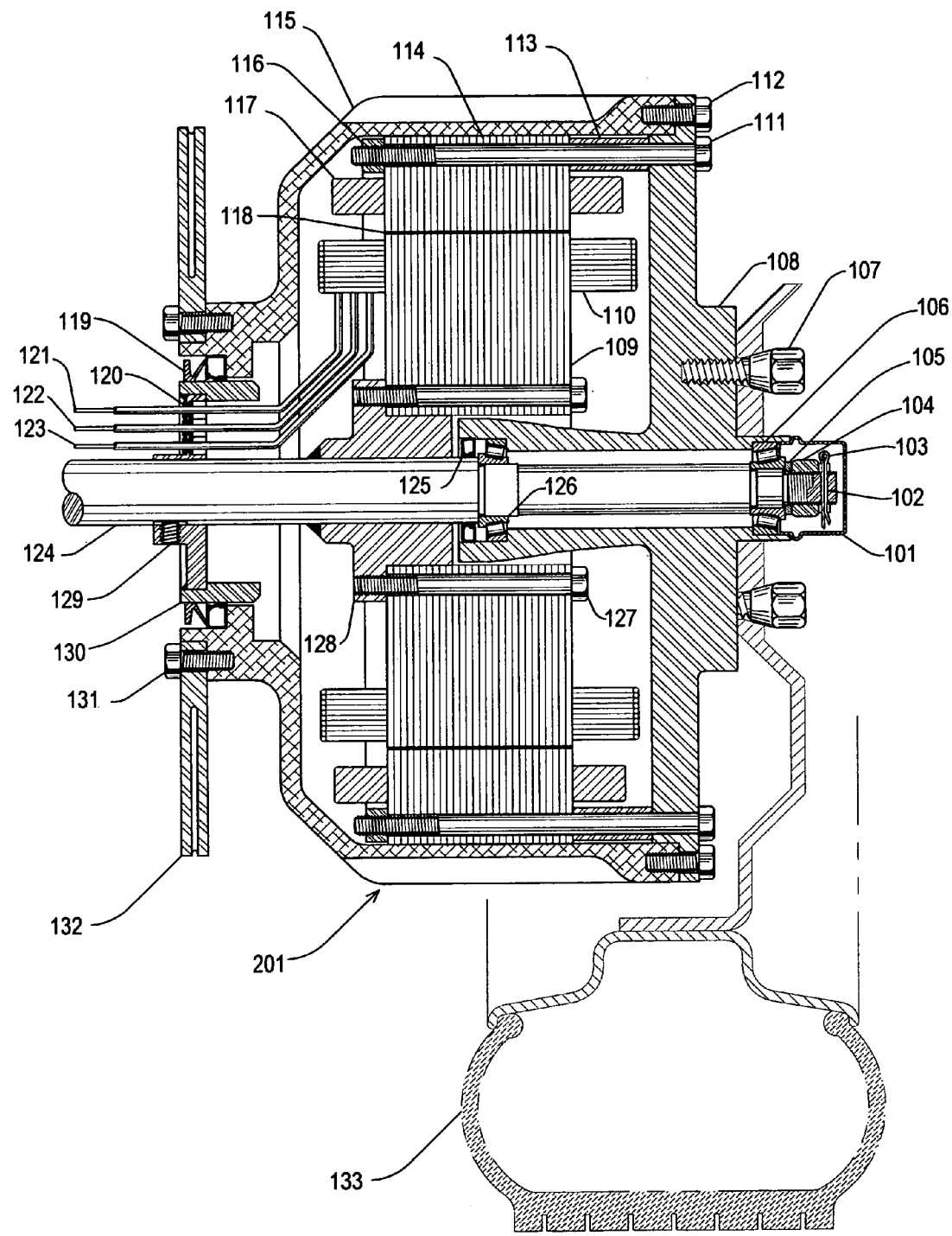
FIG. 1A is a perspective view of the preferred embodiment of the present invention.
Figure 2A:
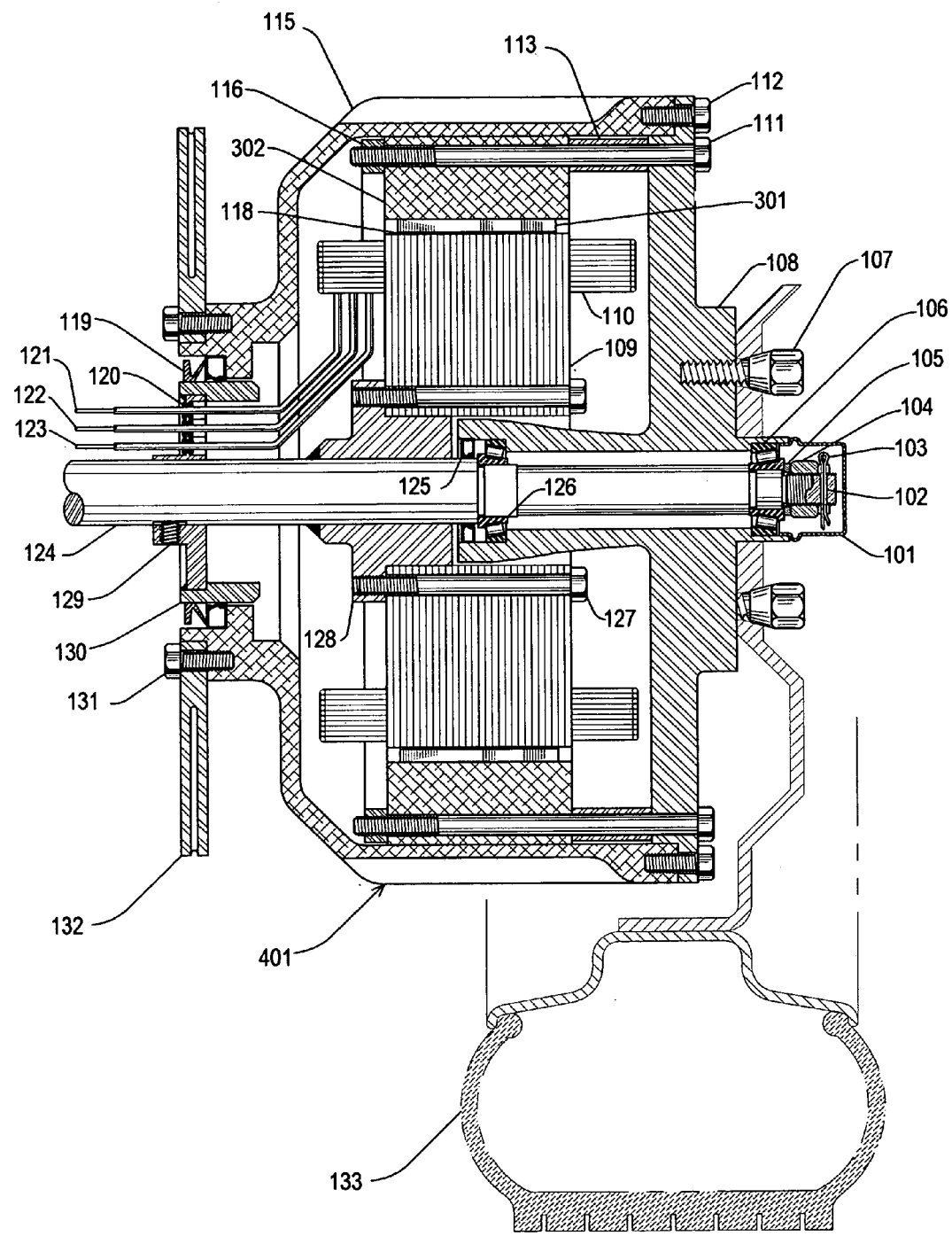
FIG. 2A is a perspective view of an alternate embodiment of the present invention.

Referring to FIGS. 1A & 2A the present invention is an alternating current, multiphase, squirrel cage, induction electric motor 201 having a unique inverted structure for providing torque/power directly to vehicle wheel(s). A full size operable prototype of motor 201 has been built, tested, and proven with satisfactory results.

The inverted, alternating current, multiphase induction electric motor 201 is comprised of a squirrel cage rotor 114, a laminated stator 109, a plurality of wire coils 110, a motor starter 226, at least one battery pack 222, and a means for attaching rotor 114 to a rotational device such as a wheel 133.

Rotor 114 of the present invention is an active electric part and has a larger diameter than stator 109. Rotor 114 is made of predetermined stack of electrical sheet steel laminations and has an electrical squirrel cage 117 built in a plurality of stamped notches (not shown) around its inside diameter. The number of stamped notches will vary depending on the diameter of the laminations and the number of poles in the motor. A predetermined copper alloy rod having known electrical characteristics and a predetermined size passes thru the notches in the laminations to help form squirrel cage 117. The same size and type of rod may be used to form a circle for each end of squirrel cage 117 and placed at the end of and attached to the rods passing thru notched laminations of rotor 114. This circle when attached to the thru rods is known in the trade as an end ring and has a predetermined resistance. The notches in the laminations have at least twice the volume required for the material used to make electrical squirrel cage 117. The extra volume of the notches is mainly located behind squirrel cage 117 and the extra volume assists in cooling. Rotor 114 has a plurality of drilled thru holes (not numbered) in its face for mounting purposes using thru bolt 111. A threaded fastening means 116 is fixed to the inside surface of rotor 114 in alignment with the thru holes using thru bolt 111. Threaded fastening means 116 is located on one side of rotor 114 and the mounting hub flange 108 is located on the other side of rotor 114.

Mounting hub 108 serves as a means for mounting the present invention 201 to a wheel 133 or multiple wheels or other devices to provide the torque required to propulsion. Mounting hub 108 can be made of materials such as, but not limited to, steel and aluminum alloy. Mounting hub 108, at its larger diameter, has a double sided flange that is machined on both sides. Mounting hub 108, at its smaller diameter, has anti-friction, tapered roller bearings 106, 126 that are mounted in the inside of each end of the mounting hub 108. The double side flange of mounting hub 108 has a plurality of drilled through holes (not numbered) for mounting rotor 114 on its inside surface with a plurality of stainless steel bolts 111. The outside of mounting hub 108 has a plurality of drilled and tapped holes (not numbered) for mounting wheel 133 with a plurality of stud bolts 107. Rotor 114 is mounted on the inside surface of mounting hub 108 and wheel assembly 133 is mounted to the outside surface of the mounting hub 108. The simplicity of mounting a rotating member of the present invention directly to a wheel or multiple wheels allows for the manufacturing of an affordable, non-polluting vehicle that has low maintenance and high efficiency.

Mounting hub 108 also has a grease seal 125 installed at the most inner point next to inner tapered roller bearing 126. Inner tapered roller bearing 126 and outer tapered roller bearing 106 are pre-loaded and held to the design pre-load position by flat washer 105, notched hex nut 104 and cotter pin 103 thru a drilled hole 102 in the support shaft/spindle 124. Hex nut 104 is tightened to a predetermined torque and cotter pin 103 is inserted and secured in hole 102 to prevent movement. The final seal is a grease cap 101 having a precision surface for mounting in the outer end of hub 108.

The laminated stator 109 is an active electrical part that is made of a predetermined stack of electrical sheet steel laminations. Unlike a conventional motor stator, stator 109 of motor 201 has a smaller diameter than rotor 114. Stator 109 has a plurality of notches in its stack of laminations (not numbered) around its outside diameter and the notches are traversed by electrical wires that form coil windings 110. The number of notches will vary depending on the diameter of the laminations and the number of electrical poles in the motor. Stator 109 has a plurality of drilled holes (not numbered) for mounting with a plurality of bolts 127 to a stationary supporting mounting flange 128 to prevent rotation. The number of drilled holes in stator 109 that are used to mount to flange 128 varies with diameter of motor 201 and the number of electrical poles in the motor. Stationary mounting flange 128 has a plurality of drilled and tapped holes (not numbered) for mounting stator 109 with a plurality of stainless steel bolts 127.

Thru bolts 111 pass thru spacer 113 and are used to mount rotor 114 to the rotating double sided flange of mounting hub 108. Similarly, thru bolts 127 are also used to mount stator 109 to stationary mounting flange 128. Thru bolts 111, 127 are made of 18.8 stainless steel because of the non-magnetic properties of this particular stainless steel. Even with thru bolts 111, 127 passing through drilled or stamped holes (not numbered) in the electrical sheet steel laminations of the rotor 114 and stator 109, the best possible rotating electric field characteristics are provided.

Rotor 114 and stator 109 are mounted to the flanges of their respective mounting hubs 108, 128 in such a way that the stator 109 is mounted inside rotor 114, leaving a precise air gap 118 of 0.020-0.050 inches between the stator 109 and rotor 114. The sides of the rotor 114 and stator 109 must be in precise alignment.

When rotor 114 and stator 109 are mounted to their respective mounting surfaces with tapered roller bearings 106, 126 with seals 101,125, washer 105, hex nut 104, and cotter pin 103, along with the wheel and tire assembly 133, assembled as described above, the required components of a true wheel motor, capable of propelling an electric vehicle are provided.

A one-piece, rotating, finned, protective motor housing 115 is mounted by a plurality of hex head threaded bolts 112 thru drilled and tapped holes (not numbered) in its face to the inside surface of the rotating mounting hub flange 108 by a plurality of drilled matching holes in its face. Rotating protective motor housing 115 can be made of light weight metals, including but not limited to, cast aluminum. Additionally, motor housing 115 has a surface at its opposite end with a plurality of drilled and tapped holes (not numbered) for a brake rotor 132 to be attached with a plurality of bolts 131.

Motor lead wires 121, 122, 123, 121A, 122A, 123A originating at wire coil 110 pass thru grommet 120 having enough length to attach directly to the multi-phase variable frequency, variable voltage output of motor control 226.

Having full length lead wires and not requiring an intermediate junction eliminates the possibility of a high resistance connection joint.

Seal assembly flange 130 is held in position by set screw 129 to support shaft/spindle 124. Seal 119 is attached to seal assembly flange 130.

The number of bolts in the present invention will vary depending on the diameter of the laminations of rotor 114 and stator 109 that change with horsepower and number of electrical poles.

Figure 1B:
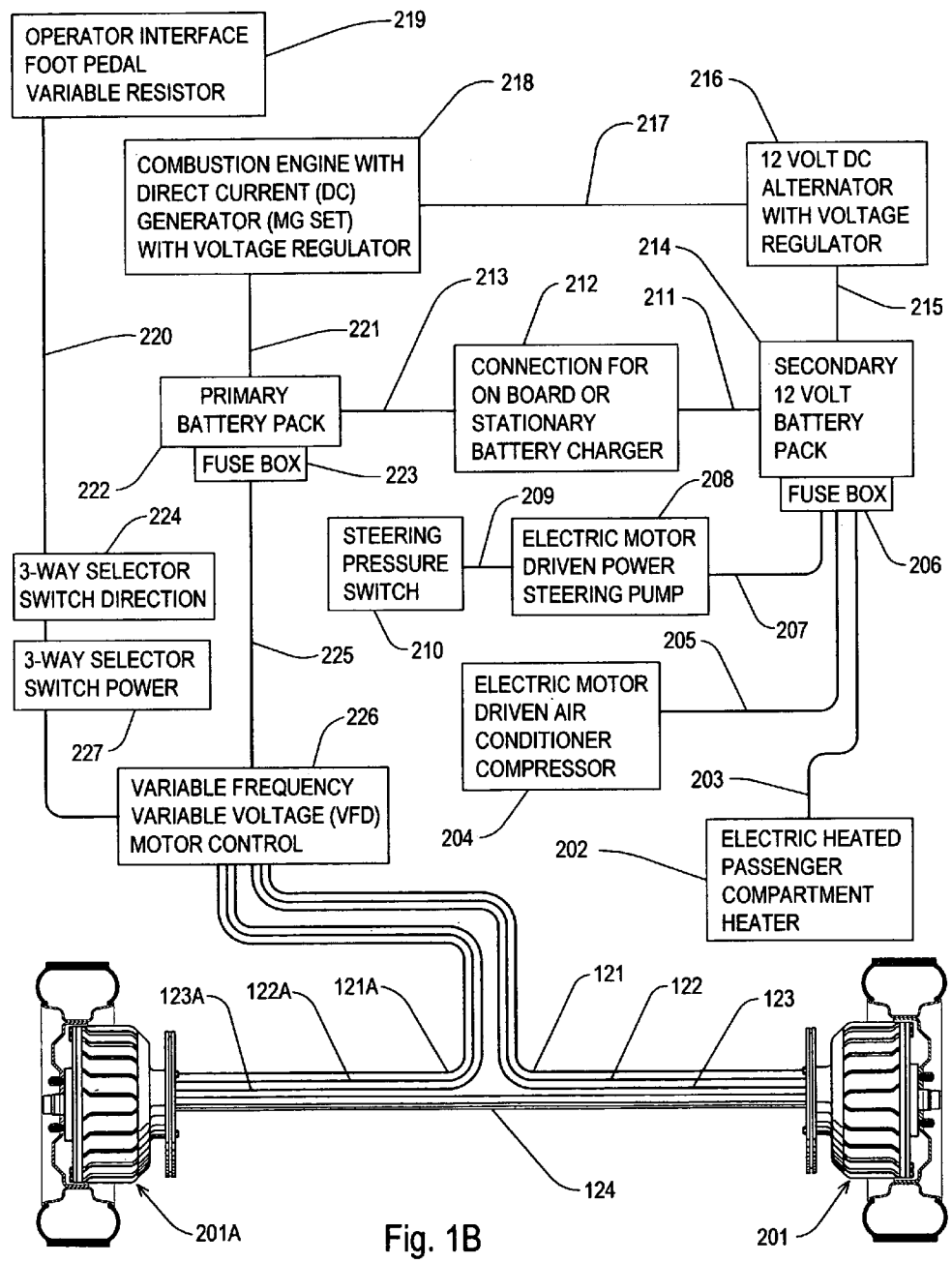
FIG. 1B is a schematic flow diagram detailing the operation of the present invention.

Referring to FIG. 1B, the inverted, electric wheel motor 201 is electrically connected to terminals (not shown) inside a modified, microprocessor type programmable, variable frequency, variable voltage motor control 226 on board the electric vehicle, and motor 201 receives its multiphase alternating current/electric power thru motor control 226. Full length motor lead wires 121, 122, 123, 121A, 122A, and 123A, are used for these connections. The modified motor control 226 is self-protecting and clears itself of any electrical fault or open connection by its internal microprocessor within 1.5 cycles when operated at 60 hertz or less.

The inverted electric wheel motor 201 can be overloaded, that is, caused to produce additional torque for several minutes, without overheating. The same is true of the motor control 226. Motor control 226 can be programmed for the additional power and time. The modified motor control is internally heat sensitive and the current allowed to pass through it would be reduced as needed, to a level low enough, to allow for safe temperature operation. The internal heat sensing means (not shown), which measures temperature, is located in the power components section of motor control 226. The internal microprocessor adjusts the motor current to the maximum allowable for safe operation. The additional torque allows for faster starts and quicker acceleration during passing or for just getting out of a pothole.

Motor control 226 is modified to be electrically connected to and receive its direct current electrical power from a plurality of batteries forming a primary storage battery pack 222 on board the electric vehicle. This modification eliminates the normal alternating current section at its input and allows direct connection to its internal DC bus. The batteries of primary storage battery pack 222 are connected by terminals (not shown) to the modified, internal direct current bus of motor control 226 thru wire connection 225. Fuses (not shown) are contained in fuse box 223 that is attached to primary storage battery pack 222. The fuses (not shown) are mounted in each of two storage battery lead wires (not shown) and the fuses are sized for short circuit protection. The fuses provide protection from a possible fire in the event of an accident that might cause any lead wire in the power circuit to be shorted to any common metal part or to each other.

Additionally, an isolated two wire system (not shown) is used in and with all electrical components in the primary electric system. No electrical connection can be made to the chassis of the vehicle by the primary electric system.

The modified motor control 226 is connected by terminal (not shown) with a multi lead, shielded cable wire 220. Shielded cable wire 220 passes thru direction selector switch 224 and power selector switch 227 and is connected appropriately to the remote mounted operator interface devise 219 for electric vehicle motor speed control and direction. No vehicle movement can take place until electric power has been initiated by power selector switch 227 and a direction has been chosen by the operator thru the three way/position direction selector switch 224. The keyed, 3 way, power selector switch 227 and keyed 3 way directional selector switch 224 can be mounted in a convenient position for the vehicle operator. The electrically isolated direction switch 224 is operated by key for security and is labeled forward, off, and reverse. The keys of selector switches 224, 227 are removable in the off position only To operate the vehicle, the operator selects a direction by turning direction selector switch 224 and then by depressing the foot pedal of operator interface 219. The foot pedal of operator interface 219 controls the movement of a variable resistor in the operator interface 219. This movement causes a resistance/control voltage change to the control input terminals (not shown) of modified motor control 226, thru the shielded multi-lead cable wire 220. By depressing the foot pedal of operator interface 219, the resistance/voltage change signals the modified motor control 226 to increase the frequency and voltage at the preprogrammed rate and the vehicle starts moving with increased speed. The amount of speed increase is dependent on the amount the foot pedal of operator interface 219 is depressed and how fast it is depressed; all in accordance with the program of modified motor control 226. The frequency and voltage, along with vehicle speed, are maintained at a steady state if the foot pedal in operator interface devise 219 is held at a steady point.

The operator/drivers input is an integral part of the controlled operation and safety of the vehicle. The operator, by adjusting the up-down pressure on the foot pedal of operator interface 219 and by adjusting the swiftness of movement of the foot pedal, is in complete control through modified motor control 226. The overall operation is user transparent and does not require operator training. Pressing the foot pedal of operator interface 219 gently causes torque to be applied to inverted wheel motors 201, 201A and causes the vehicle to begin normal movement. Pressing the foot pedal of operator interface 219 more swiftly causes a quicker start and faster acceleration. Releasing some pressure from the foot pedal of operator interface 219 causes modified motor control 226 to apply a pre-programmed retarding torque to the inverted wheel motors 201, 201A causing the vehicle to slow quicker than just coasting. As more pressure is released from the foot pedal of motor control 219, more retarding torque is applied. If the foot pedal of operator interface 219 is abruptly and fully released, maximum retarding torque is applied to wheel motors 201, 201A thru motor control 226. All parameters concerning the movement of the foot pedal of operator interface 219 are programmable, and any part of the program is reprogrammable by a technician. The operator would, as needed, apply the normal hydraulic or air foot brake, in the normal way for as much braking effort as seems necessary.

For safety, the foot pedal of operator interface 219 spring returns to the off position should foot pedal pressure be fully released. When foot pedal pressure is fully released a decelerating force is applied to inverted wheel motors 201, 201a by motor control 226 as pre-programmed. This is also a safety feature for stopping the vehicle should the operator become incapacitated. As pressure on the foot pedal of operator interface 209 is released, the frequency and voltage are also reduced at a preprogrammed rate and this produces a decelerating force that helps slow the vehicle. The same is true for a vehicle that is traveling down a grade, in that, the foot operated brakes (not shown) do not normally need to be applied to maintain a safe speed.

While a decelerating force is being applied by modified motor control 226, the regenerative power of inverted motors 201, 201A may be directed to the primary storage battery pack 222 for recharging through wire connection 225.

The vehicle's braking method, such as, but not limited to, closed-circuit hydraulic and/or air system, as used on vehicles in use today, is not hindered in any way from operating in its normal fashion. However, the normal brake function is used less and requires less maintenance than normal, because of the deceleration force produced by modified motor control 226 and inverted electric wheel motor 201.

A secondary battery pack 214 comprised of a plurality of batteries is used to provide power to any on board device thru wire connections 203, 205, 207 requiring a lower voltage than that provided by the primary storage battery pack 222. The positive battery lead wire has a fuse (not shown) that is mounted close to secondary battery pack 214 in the attached fuse box 206 and is sized for short circuit protection to prevent a fire. The negative battery lead is grounded to the vehicle chassis and is not fused as it would not serve any function.

Primary storage battery pack 222 and secondary storage battery pack 214 can also be recharged thru wire connection 211, 213 from a commercial grid powered battery charger, either on board or at a stationary fixed location thru connection 212 that is provided.

The preferred embodiment at this time uses lead acid storage batteries in primary battery pack 222 and in secondary battery pack 214. As the advanced technology storage batteries are perfected and an acceptable method of charging and recharging them has been designed and proven, their use will likely provide less weight, more miles and more time between charges. Some engineers are predicting that the new nickel-metal-hydride or lithium-ion storage batteries, when perfected, will not only reduce cost, but last the life time of the electric vehicle which is estimated to be up to 20 years or 200,000 miles of charging cycles.

The direct current primary storage battery pack 222 has its design charge voltage maintained thru wire connection 221 by an onboard engine driven motor generator set 218 which is comprised a combustion engine, an onboard direct current generator, and an internal voltage regulator. The internal voltage regulator (not shown) of motor generator set 218 determines the batteries' voltage requirements and provides the appropriate charge.

The combustion engine of motor generator set 218 can be liquid cooled with a radiator (not shown) appropriately connected. Small vehicles could use an air cooled, internal combustion engine for driving the direct current generator.

The combustion engine of motor generator set 218, is also mechanically connected by mechanical connection 217 to an electric alternator 216, with internal voltage regulator (not shown), producing direct current at its output. Alternator 216 maintains the design charge voltage of secondary battery pack 214 thru wire connection 215 used with various onboard devices that require a lower direct current voltage, than primary battery pack 222. Some of the onboard devices using secondary battery pack 214 are, lights, entertainment devices, receptacles for portable electronic devices, fans for electric heater 202 for comfort devices and electric motor driven air conditioning compressor and/or electric motor driven power steering pump, for an all electric vehicle. The air conditioner compressor 204 and/or power steering pump 208 can be either electrically driven, receiving power from the secondary battery pack 214, or mechanically driven by mechanical connection 217 and the onboard combustion engine of motor generator set 218.

The electric motor driven, power steering pump 208 only runs when a pressure switch 210 connected to the vehicle steering means (not shown) indicates that an assist is needed to turn a steering wheel. Normal driving would not require any assistance. However at very low speeds such as parking, assistance may be required.

When an internal combustion engine is added, the internal combustion engine does not propel the vehicle. The internal combustion engine only powers the direct current generator for charging the primary storage battery pack and powers peripheral devices such as an alternator with direct current output for charging the secondary storage battery pack. The internal combustion engine does not directly propel the vehicle at any time and would run only when a sensor such as a battery voltage detector calls for charging. The purpose of the engine is to add more time and miles between recharging of the battery packs from the commercial grid powered battery charger connection. The internal combustion engine only runs at one of two speeds, idle speed or full design speed, as required for the direct current generators output. The full design speed is the best combination of speeds for efficiency of fuel and the lowest possible pollution out of the engine. The methods used in the present invention optimize the performance of the electric vehicle.

The vehicle has a keyed three-way/position, maintained power selector switch 227 that can be mounted in a convenient position for the vehicle operator. Three way power selector switch 227 is labeled run, off, and automatic. The key for power selector switch 227 is removable in the off position only. Only pre-selected devices are operable with the keyed power selector switch 227 in the off position, such as, but not limited to, emergency flashers, receptacles for plug in devices and horn. With keyed power selector switch 227 in the run position, the vehicle would be operable as would any onboard devices that receive their electric power from onboard primary storage battery pack 222 and secondary storage battery pack 214, without any benefits from devices powered by the combustion engine of motor generator set 218. With keyed power selector switch 227 in the automatic position, all methods of operation would be useable, including those powered by the internal combustion engine of motor generator set 218. The keyed direction selector switch 224 must be in a direction position and keyed power selector switch 227 must be in the run or automatic position before torque can be applied to the inverted wheel motor(s) 201, 201A.

For safety, the direction selector switch 224 and power selector switch 227 utilize keys of different types, so that neither key can be inserted in an inappropriate switch. Both the keys must be inserted and both selector switches 224, 227 must have appropriate positions selected before the vehicle motor control is operable.

All wire leads, which are connected to terminal boards or direct to various devices, shall be numbered and color-coded. The wire leads shall have designations, which conform to future, system electric drawings.

Figure 2B:
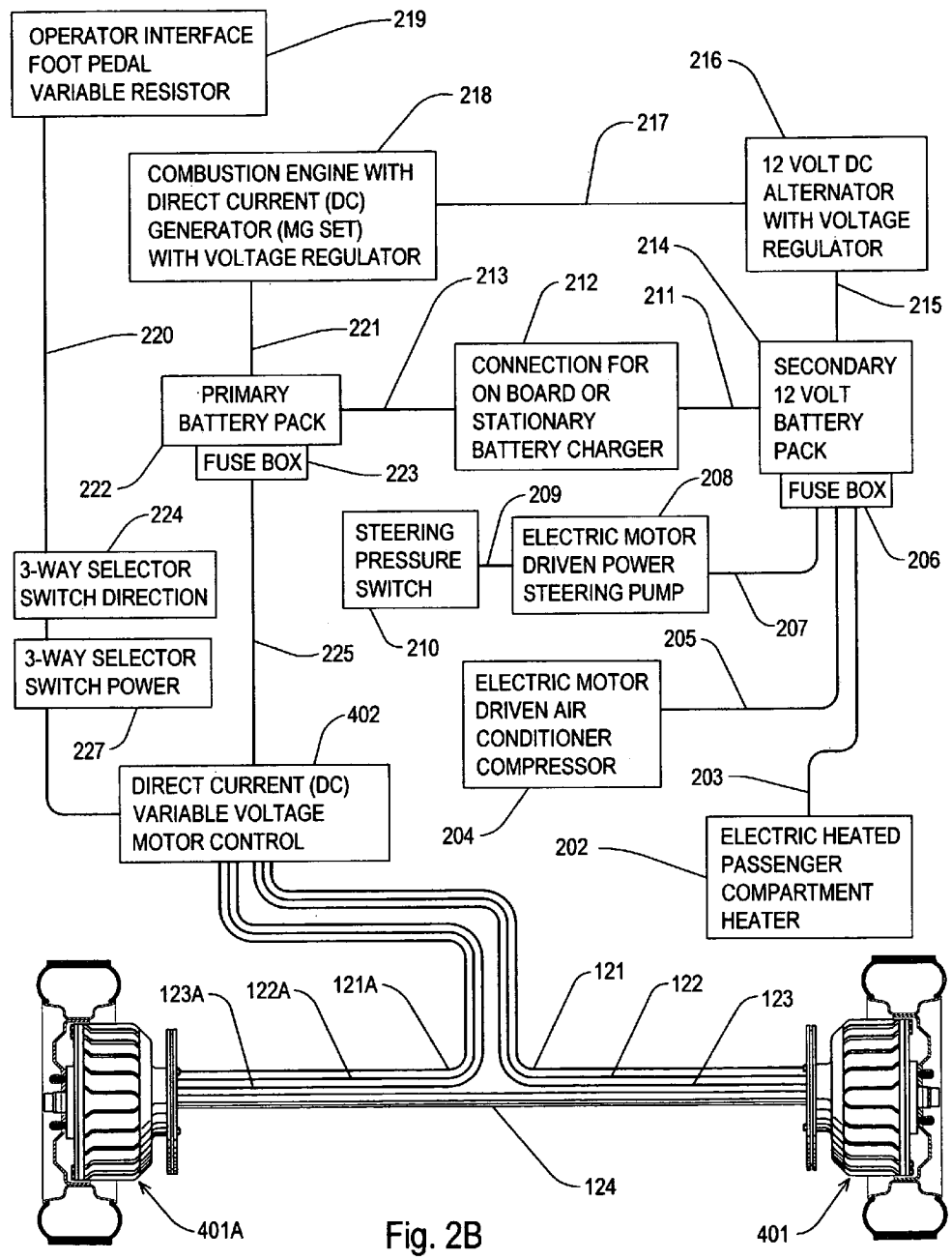
FIG. 2B is a schematic flow diagram detailing the operation of an alternate embodiment of the present invention.

FIGS. 2A, 2B illustrate an alternate embodiment of the present invention. The alternate embodiment has the same structure as the preferred embodiment, except that rotor 302 is made of aluminum casting and rotor 302 has permanent magnet segments 301 mounted on its inside surface. The quantity of the permanent magnet segments will be determined by the diameter of the rotor. Additionally, the function of the alternate embodiment allows the use of direct current. The motor starter of the alternate embodiment can be a programmable solid state direct current variable voltage motor control 402.

Although this invention has been described in detail, with respect to a preferred embodiment and alternative embodiments thereof, it will be apparent to those skilled in the art that various modifications are possible, without departing from the scope of the present invention.

I claim:

1. An inverted, alternating current, multiphase, squirrel cage, induction electric motor; comprising:
    A laminated rotor having a plurality of notches, said rotor having a squirrel cage disposed within said notches made of dissimilar metal than said laminations;
    a laminated stator having a plurality of notches, said stator being disposed within said rotor and said stator having a smaller diameter than said rotor;
    a plurality of electric wires traversing said stator through said notches forming coils;
    a motor starter having capability of allowing electric current to pass in a controlled manner from the electrical source to said coils in said stator;
    at least one battery pack supplying electric power to said motor starter, having connectors for an external battery charger; and
    a means for attaching said rotor to a rotational device.

2. The inverted, electric motor of claim 1, wherein said means for attaching said rotor to a rotational device is a mounting hub having a double sided flange.

3. The inverted, electric motor of claim 1, wherein said stator is made of laminations of electrical sheet steel.

4. The inverted, electric motor of claim 1, wherein said rotor is made of laminations of electrical sheet steel.

5. The inverted electric motor of claim 1, wherein said rotor has a squirrel cage cast within said notches using metal dissimilar to said electrical sheet steel.

6. The inverted, electric motor of claim 1, wherein said rotor is made of aluminum alloy casting and has a plurality of permanent magnet segments disposed within the inside diameter of said rotor.

7. The inverted, electric motor of claim 1, further comprising a protective motor housing.

8. The inverted, electric motor of claim 1, wherein said motor starter is a programmable variable frequency, variable voltage motor controller.

9. The inverted, electric motor of claim 8, wherein said programmable variable frequency, variable voltage motor controller is modified to be heat sensitive and is capable of receiving power directly from said DC batteries to it's DC BUS.

10. The inverted, electric motor of claim 8, wherein said programmable variable frequency, variable voltage motor controller is connected to an operator controlled interface.

11. The inverted, electric motor of claim 8, wherein said programmable variable frequency, variable voltage motor controller is connected to an automated controlled interface.

12. The inverted, electric motor of claim 1, wherein said motor starter is a programmable direct, variable voltage current motor control.

13. The inverted, electric motor of claim 12, wherein said programmable direct current, variable voltage motor controller is connected to an operator controlled interface.

14. The inverted, electric motor of claim 12, wherein said programmable, direct current, variable voltage motor controller is connected to an automated controlled interface.

15. The inverted, electric motor of claim 1, further comprising an internal combustion engine.

16. The inverted, electric motor of claim 15, further comprising a direct current generator that receives rotational power from said internal combustion engine and provides direct current to said at least one battery pack.

17. The inverted, electric motor of claim 15, further comprising an alternator that receives its rotational power from said internal combustion engine and provides direct current to said at least one battery pack.

18. A method of propelling a vehicle solely by electricity, comprising the steps of: obtaining an inverted, alternating current, multiphase, squirrel cage induction electric motor;
    obtaining at least one battery pack;
    obtaining at least one programmable variable frequency, variable voltage motor controller that is modified to be heat sensitive and is capable of receiving power directly from the DC battery pack to it's DC BUS, said motor controller having connections for an operator controlled interface and having at least one direct current bus; and mechanically and electrically combining said inverted, alternating current, multiphase, squirrel cage induction electric motor with said heat sensitive programmable variable frequency, variable voltage motor controller and said at least one battery pack.

19. A method of propelling a vehicle solely by electricity, comprising the steps of:
    obtaining an inverted, permanent magnet electric motor;
    obtaining at least one battery pack;
    obtaining at least one programmable variable voltage motor controller that is modified to be heat sensitive and is capable of receiving power directly from the DC battery pack to it's DC BUS, said motor controller having connections for an operator controlled interface and having at least one direct current bus; and mechanically and electrically combining said inverted, permanent magnet electric motor with said heat sensitive programmable direct current variable voltage motor controller and said at least one battery pack.

* * * * *